(12) United States Patent
Walter (10) Patent No.: US 11,220,322 B2
(45) Date of Patent: Jan. 11, 2022

(54) AIRCRAFT CANOPY JETTISON

(71) Applicant: The Boeing Company, Chicago, IL (US)

(72) Inventor: Matthew W. Walter, Troy, MO (US)

(73) Assignee: THE BOEING COMPANY, Chicago, IL (US)

(*) Notice: Subject to any disclaimer, the term of this patent is extended or adjusted under 35 U.S.C. 154(b) by 91 days.

(21) Appl. No.: 16/869,035

(22) Filed: May 7, 2020

(65) Prior Publication Data

US 2021/0347463 A1    Nov. 11, 2021

(51) Int. Cl.
*B64C 1/14*        (2006.01)
*B64C 1/32*        (2006.01)
*B64D 25/10*      (2006.01)

(52) U.S. Cl.
CPC .............. *B64C 1/32* (2013.01); *B64C 1/1476* (2013.01); *B64D 25/10* (2013.01)

(58) Field of Classification Search
CPC .......... B64D 25/10; B64D 25/08; B64C 1/32; B64C 1/1476
See application file for complete search history.

(56) References Cited

U.S. PATENT DOCUMENTS

| | | | | |
|---|---|---|---|---|
| 2,673,050 A | * | 3/1954 | Patch ................... | B64C 1/1476 244/121 |
| 2,828,093 A | * | 3/1958 | Kaplan ................. | B64C 1/1476 244/121 |
| 2,828,094 A | * | 3/1958 | Hildebrand ........... | B64C 1/1476 244/121 |
| 2,924,418 A | * | 2/1960 | Nolan ................... | B64C 1/1476 248/354.1 |
| 3,194,517 A | * | 7/1965 | Morris .................. | B64C 1/1476 244/121 |
| 3,547,382 A | * | 12/1970 | Stanley ................. | B64D 25/08 244/121 |
| 3,670,998 A | * | 6/1972 | Charleville ............. | B64C 1/32 244/121 |
| 3,768,759 A | * | 10/1973 | Martin .................. | B64D 25/08 244/121 |
| 4,375,281 A | * | 3/1983 | Nichols ................. | B64C 1/1476 244/121 |
| 5,205,516 A | * | 4/1993 | Bright ................... | B64C 1/1476 244/121 |
| 6,796,528 B2 | * | 9/2004 | Wood .................... | B64C 1/1476 244/121 |
| 8,061,656 B1 | * | 11/2011 | Renn ..................... | E05D 7/1044 244/122 AF |

* cited by examiner

*Primary Examiner* — Brian M O'Hara
(74) *Attorney, Agent, or Firm* — Hanley, Flight & Zimmerman, LLC (57) ABSTRACT

Aircraft canopy jettison systems, apparatus, and methods are described herein. An example aircraft includes a forward fuselage defining a cockpit, a seat in the cockpit, a pivot pin coupled to the forward fuselage, and a canopy removably coupled to the forward fuselage over the cockpit. The canopy includes a frame having a hinge portion. The hinge portion includes a cam. The cam is dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

20 Claims, 10 Drawing Sheets

AIRCRAFT CANOPY JETTISON

GOVERNMENT LICENSE RIGHTS

This invention was made with Government support under 18-D-0107 awarded by the United States Department of Defense. The government has certain rights in this invention.

FIELD OF THE DISCLOSURE

This disclosure relates generally to aircraft canopies and, more particularly, to aircraft canopy jettison.

BACKGROUND

Some known aircraft include an ejection system for ejecting a seat (along with a pilot) from a cockpit of the aircraft. For example, during an emergency situation such as an imminent crash, it may be desirable to eject the pilot from the aircraft. Therefore, the ejection system can be used to remove the pilot from the aircraft. Prior to ejecting the seat (along with the pilot), a canopy over the cockpit is jettisoned from the aircraft so that the seat (and/or the pilot) do not collide with the canopy during ejection.

SUMMARY

An example aircraft disclosed herein includes a forward fuselage defining a cockpit, a seat in the cockpit, a pivot pin coupled to the forward fuselage, and a canopy removably coupled to the forward fuselage over the cockpit. The canopy includes a frame having a hinge portion engaged with the pivot pin. The hinge portion includes a cam. The aircraft also includes a canopy jettison rocket motor to, when activated, move the canopy away from the forward fuselage, such that the canopy (1) rotates about the pivot pin until reaching a release angle and then (2) releases from the pivot pin and moves away from the forward fuselage. The cam is to restrict the canopy from releasing from the pivot pin until the canopy reaches the release angle. The cam dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

An example method disclosed herein includes activating a canopy jettison rocket motor on an aircraft. The activating of the canopy jettison rocket motor causes the canopy to (1) rotate about a pivot pin until reaching a release angle and then (2) release from the pivot pin and move away from a forward fuselage of the aircraft. The canopy includes a frame having a hinge portion. The hinge portion includes a cam to restrict the canopy from releasing from the pivot pin until the canopy reaches the release angle. The cam is dimensioned such that when the canopy is jettisoned while the aircraft is at zero altitude and zero airspeed, a travel path of the hinge portion does not intersect a travel path of a seat when the seat is ejected while the aircraft is at zero altitude and zero airspeed.

An example aircraft disclosed herein includes a forward fuselage defining a cockpit, a seat in the cockpit, a bell crank pivotably coupled to the forward fuselage, a pivot pin coupled to the bell crank, and a canopy removably coupled to the forward fuselage over the cockpit. The canopy includes a frame having a hinge portion engaged with the pivot pin. The hinge portion includes a cam. The example aircraft also includes a canopy remover to, when activated, move the canopy away from the forward fuselage, such that the canopy (1) rotates about the pivot pin until reaching a release angle and then (2) releases from the pivot pin and moves away from the forward fuselage. The cam is to restrict the canopy from releasing from the pivot pin until the canopy reaches the release angle. The cam dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example aircraft and example ejection systems and methods for ejecting a seat and jettisoning a canopy from such aircraft. The example ejection systems and methods disclosed herein prevent or reduce the likelihood of collision of a pilot with the canopy during an ejection operation. The example ejection systems and methods disclosed herein also reduce the time delay between jettisoning the canopy and ejecting the seat, thereby enabling a pilot to be ejected from the aircraft earlier in the ejection operation. This time can be critical during an emergency situation and, thus, improves the safety of the pilot.

Some aircraft, such as fighter planes, include an ejection system that can be triggered to eject one or more pilots from a cockpit of the aircraft. The ejection system includes a rocket-catapult that ejects (launches) a seat in which the pilot is sitting from the cockpit. Before ejecting the seat, a canopy over the cockpit is jettisoned (removed) from the cockpit according to a jettison sequence. In known aircraft, a rocket or thruster is used to rotate the canopy about a rear (aft) hinge portion of the canopy. After the canopy is rotated a certain amount, the canopy releases from the fuselage. In other words, the canopy rotates open and then detaches from the fuselage and flies generally upward and aft from the cockpit, thereby clearing the path for the seat (with the pilot) to be ejected. However, once the canopy releases from the forward fuselage, the canopy undergoes unconstrained projection motion and begins rotating about its own center of gravity. As a result of this rotation, the rear portion (i.e., the hinge portion) of the canopy often swings forward over the cockpit before the entire canopy moves aft and clear of the cockpit. To ensure the seat is not ejected while the rear portion of the canopy is above the seat, a time delay is implemented. In particular, the ejection of the seat is delayed by a certain amount of time (e.g., 500 ms) after the canopy is detached. Once the amount of time passes, the seat (with the pilot) can be ejected. This time delay, although small, is often very crucial, especially in an emergency egress scenario such as an imminent crash or destruction of the aircraft.

Disclosed herein are example ejection systems and methods that jettison a canopy from a cockpit such that that a travel path of the rear portion of the canopy (e.g., the hinge portion) does not intersect a travel path of the seat. An example canopy disclosed herein includes a frame with a hinge portion. The hinge portion includes a hinge fork that is engaged with a pivot pin coupled to a forward fuselage. When the canopy is rotated upward during a jettison sequence, the hinge fork pivots about the pivot pin. Further, the hinge portion of the canopy includes a cam that rolls and/or slides along a roller that is coupled to the fuselage. The interaction between the cam and the roller prevents or restricts the canopy from releasing from the forward fuselage until the canopy reaches a certain release angle. In examples disclosed herein, the cam is dimensioned such that when the canopy is jettisoned while the aircraft is at zero altitude and zero airspeed, a travel path of the hinge portion (the rearmost portion) of the canopy does not intersect a travel path of the seat when the seat is ejected. In general, an ejection at zero altitude and zero airspeed is considered the worse-case scenario. At any altitude above zero and/or any airspeed above zero, the pressure of the air and/or the airflow over the aircraft helps remove the canopy more quickly and, thus, aids in moving the canopy out of the way of the travel path of the seat. However, at zero altitude and zero airspeed, such as when the aircraft is sitting stationary on a runway at sea level, the air pressure and airflow do not aid in moving the canopy. As such, at zero altitude and zero airspeed, the only meaningful factors controlling the travel paths of the canopy and the sat are the design of canopy and corresponding ejection system components.

Therefore, the canopies and ejection systems disclosed herein are designed to ensure the canopy and seat travel paths do not intersect or coincide during an ejection operation in the worse-case scenario. Because the travel path of the hinge portion of the canopy does not intersect the travel path of the seat in the worse-case scenario, a time delay is not required as in known systems. Instead, the seat can be ejected once the canopy reaches a certain angle that ensures the canopy will be clear of the travel path of the seat once the seat is ejected, even if the canopy is still rotating and has not yet detached from the forward fuselage. As such, the pilot can be ejected from the aircraft earlier in the ejection operation. Further, this relaxes or reduces the sensitivity and constraints around the timing of the sequence, which reduces costs associated with testing and assembling such systems.

Figure 1:
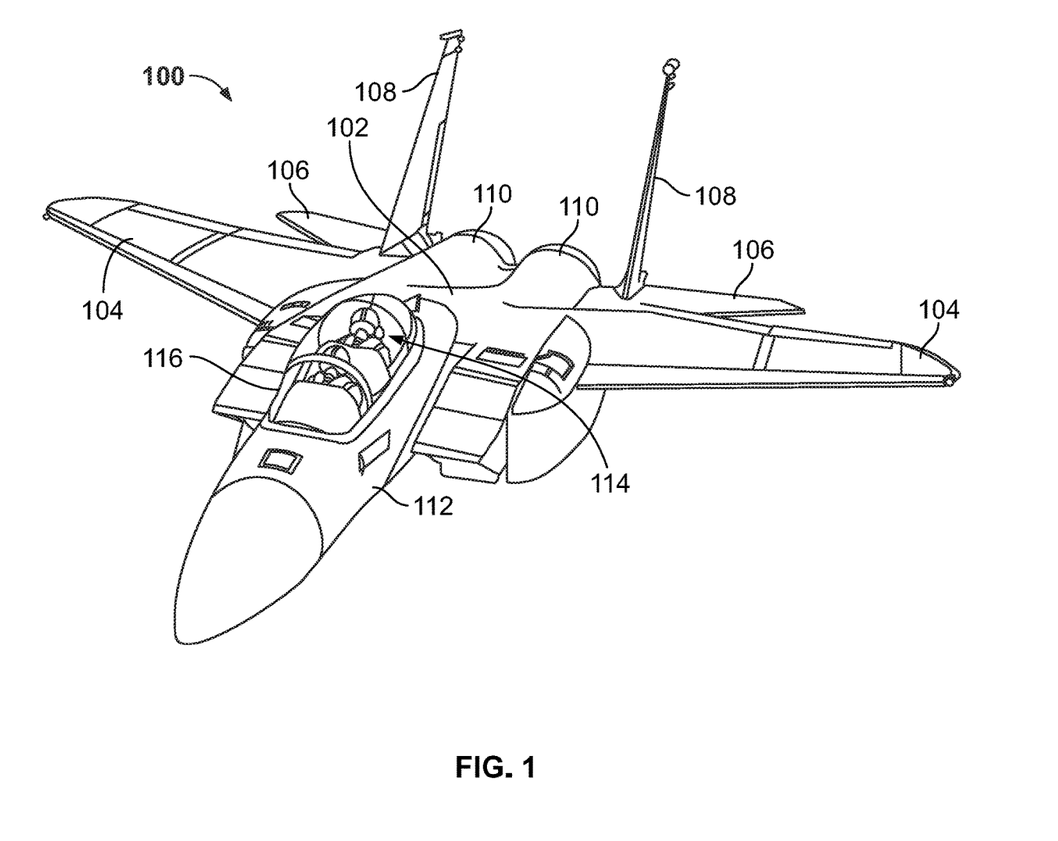
FIG. 1 illustrates an example aircraft in which the examples disclosed herein can be implemented.

Now turning to the figures, FIG. 1 illustrates an example aircraft 100 in which the examples disclosed herein can be implemented. In the illustrated example, the aircraft 100 includes a fuselage 102, wings 104, horizontal stabilizers 106, vertical stabilizers 108, and engines 110 (e.g., jet engines). In operation, the engines 110 generate thrust to propel the aircraft 100 forward while the wings 104 generate lift. The wings 104, the horizontal stabilizers 106, and/or the vertical stabilizers 108 can include movable control surfaces (e.g., ailerons, flaps, elevators, rudders, etc.) to maneuver the aircraft 100 while thrust is provided by the engines 110. In other examples, the aircraft 100 can include more or fewer engines and/or more or fewer flight control surfaces.

In the illustrated example, the aircraft 100 includes a forward fuselage 112 (sometimes referred to as an aircraft forebody). The forward fuselage 112 defines a cockpit 114. One or more persons (e.g., a pilot, a passenger, etc.) can sit in the cockpit 114 to operate and/or otherwise travel in the aircraft 100. In this example, the cockpit 114 holds two persons. In other examples, the cockpit 114 may be designed to hold only one person or more than two persons. The person(s) sit in respective seats in the cockpit 114.

In the illustrated example, the aircraft 100 includes a canopy 116 is disposed over the cockpit 114. The canopy 116 is at least partially constructed of transparent glass, plastic, or other material that enables the pilot(s) and/or passenger(s) to see out of the aircraft 100. The canopy 116 is removably coupled to the forward fuselage 112 over the cockpit 114 and can be removed from the forward fuselage 112 during an ejection operation or sequence, as disclosed in further detail herein. The aircraft 100 includes an ejection system that can be used to eject the seat(s) from the aircraft 100 such as during a critical situation. The example ejection system jettisons the canopy 116 from the forward fuselage 112 prior to ejecting the seat(s). The example ejection system is disclosed in further detail herein.

In the illustrated example, the aircraft 100 is depicted as a type of fighter jet aircraft. However, the example systems and methods disclosed herein can be implemented in any other type of vehicle having a removable canopy, such as other fixed wing aircraft (e.g., a commercial aircraft), non-fixed wing aircraft, and/or other types of vehicles (e.g., a car, a train, etc.).

Figure 2:
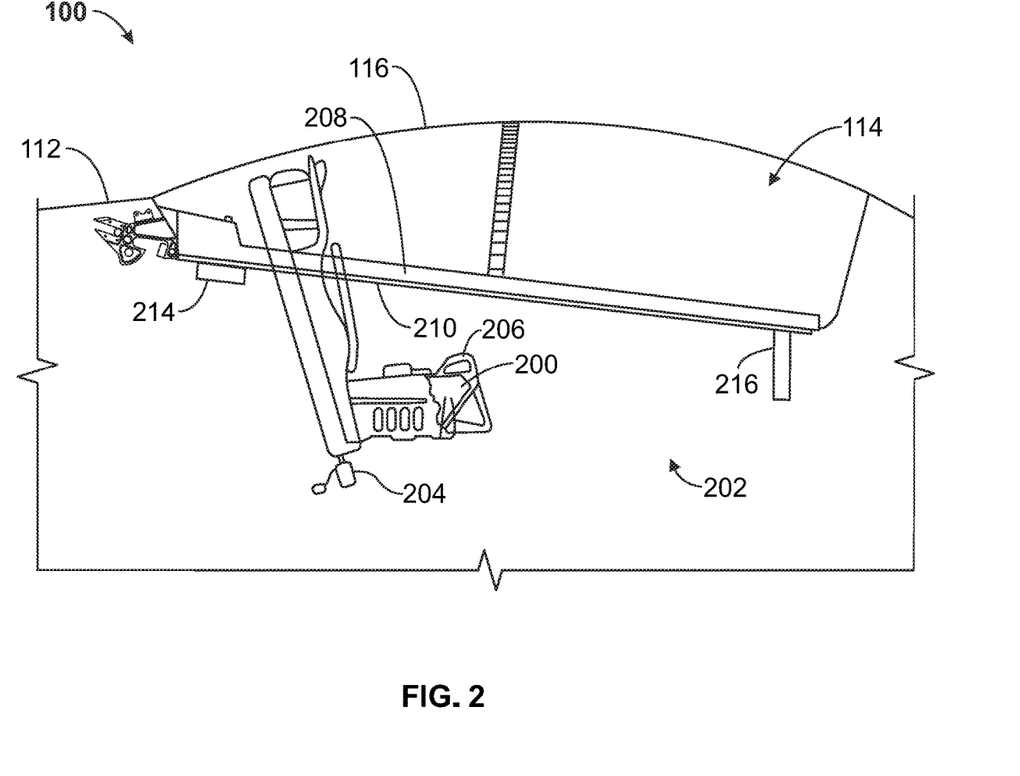
FIG. 2 is a side view of a forward fuselage of the example aircraft of FIG. 1 showing an example canopy and an example ejection system constructed in accordance with the teachings of this disclosure.

FIG. 2 is a side view of the forward fuselage 112 of the aircraft 100. The forward fuselage 112 is shown as transparent to expose internal parts of the cockpit 114. In the illustrated example, the aircraft 100 includes a seat 200 for a pilot or passenger. In the illustrated example, only one seat 200 is shown. However, in other examples, a second seat may be positioned in front of the seat 200. The seat 200 is removably coupled to the forward fuselage 112 in the cockpit 114. For clarity, the examples disclosed herein are described in connection with a pilot in the seat 200. However, in other examples, the person in the seat 200 may not be a pilot.

During emergency situations, it may be desirable to eject the seat 200 (along with the pilot) from the aircraft 100. For example, in the event of failure or destruction of one or more systems of the aircraft 100, or an imminent crash, the pilot may desire to be ejected from the aircraft 100. To eject the seat 200, the aircraft 100 includes an ejection system 202. In this example, the ejection system 202 includes an ejection seat rocket-catapult 204 coupled to the seat 200. When activated, the rocket-catapult 204 ejects (e.g., launches, propels, etc.) the seat 200 (along with the pilot in the seat 200) vertically from the cockpit 114. The rocket-catapult 204 can be implemented as a rocket, an actuator, a motor, and/or any other device capable of ejecting the seat 200 from the cockpit 114.

Prior to ejecting the seat 200, the ejection system 202 jettisons the canopy 116 from the aircraft 100, so that the pilot and/or the seat 200 do not collide with the canopy 116 when being ejected. The canopy 116 and the seat 200 are jettisoned/ejected in accordance with an ejection operation or sequence. This ejection operation includes a jettison sequence for removing the canopy 116 and then ejecting the seat 200. The ejection operation can be activated via a trigger, such as pulling on an ejection handle 206 located near the seat 200. Once triggered, one or more thrusters or rocket devices are triggered in sequence to jettison the canopy 116 and eject the seat 200, as disclosed in further detail herein.

In the illustrated example, the canopy 116 includes a frame 208. The frame 208 can be constructed of metal or another rigid, durable material. The frame 208 is coupled to a canopy sill 210 defining the upper opening in the forward fuselage 112 for the cockpit 114. The frame 208 is releasably locked to the canopy sill 210. In an example jettison sequence, the canopy 116 is slid aft on the canopy sill 210. Then, the canopy 116 is rotated about a rear hinge until the canopy 116 is released from the hinge and launched upward and rearward. An example of this sequence is shown in further detail in connection with FIGS. 3A-3E. In this example, the ejection system 202 includes a canopy unlatch thruster 214 and a canopy jettison rocket motor 216. The unlatch thruster 214, when activated, slides the canopy 116 aft (rearward, to the left in FIG. 2). The rocket motor 216, when activated, launches the canopy 116 upward, which causes the canopy 116 to rotate about a hinge, as disclosed in further detail herein.

Figure 3A:
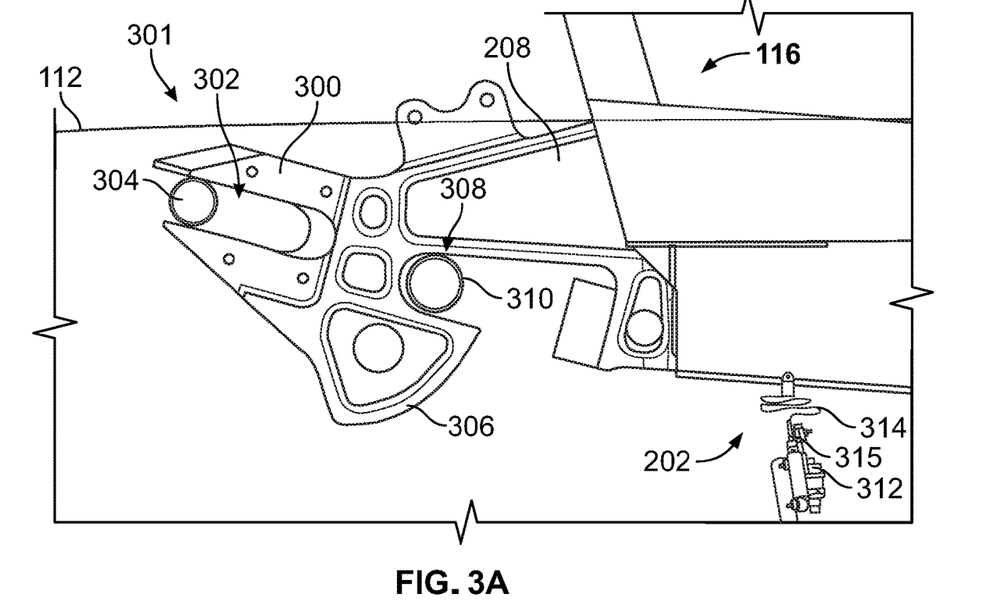
FIGS. 3A-3E illustrate an example jettison sequence in which the example canopy of FIG. 2 is jettisoned from the example aircraft.

FIGS. 3A-3E are enlarged views of the rear portion of the canopy 116 during an example canopy jettison sequence that occurs when the canopy 116 is jettisoned from the forward fuselage 112 of the aircraft 100 (FIG. 1). Referring to FIG. 3A, the frame 208 of the canopy 116 has a hinge portion 301, which is the rearmost portion of the canopy 116. In the illustrated example, the hinge portion 301 of the frame 208 includes a hinge fork 300. The hinge fork 300 defines a hinge slot 302. In this example, the aircraft 100 includes a pivot pin 304 that is coupled to the forward fuselage 112. In the position of the canopy 116 shown in FIG. 3A, the pivot pin 304 is disposed in the hinge slot 302. As such, the hinge portion 301 is engaged with the pivot pin 304. In the illustrated example, the hinge portion 301 of the frame 208 also includes a cam 306. The frame 208 defines a roller slot 308 above the cam 306. The aircraft 100 includes a roller 310 that is coupled to the forward fuselage 112. In some examples, the roller 310 is rotatable about its center or central axis. In other examples, the roller 310 is fixed and does not rotate. In the position of the canopy 116 shown in FIG. 3A, the roller 310 is disposed in the roller slot 308.

In the illustrated example, the ejection system 202 of the aircraft 100 (FIG. 1) includes a pyrotechnic device 312 (sometimes referred to as a mechanical initiator) that is coupled to the forward fuselage 112. The ejection system 202 also includes a lanyard 314 (e.g., a cord, a strap, etc.) that is coupled between the canopy 116 (e.g., the frame 208) and a pin 315 of the pyrotechnic device 312. When the canopy 116 is rotated to a certain angle, the lanyard 314 pulls the pin 315 to activate the pyrotechnic device 312. The pyrotechnic device 312 can be used to trigger or activate the rocket-catapult 204 (FIG. 2) for ejecting the seat 200 (FIG. 2), as disclosed in further detail herein.

Figure 3B:
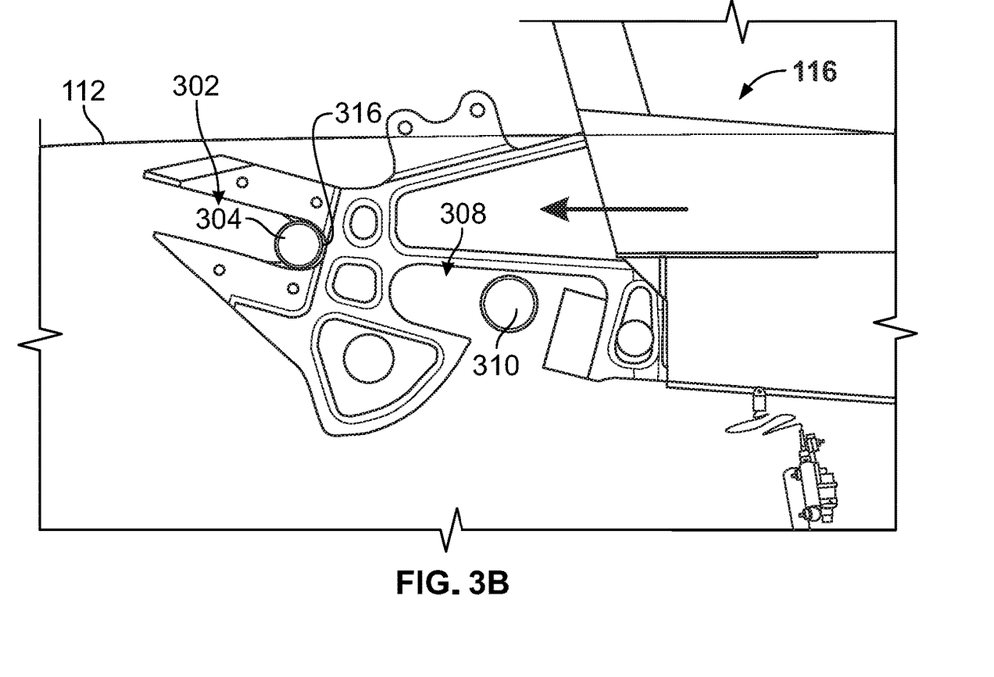

In FIG. 3A, the canopy 116 is in a first or forward position, which is the typical position that the canopy 116 is in during normal flight operations. The canopy 116 is slidable aft (to the left in FIG. 3A) on the forward fuselage 112 from the first position to a second position shown in FIG. 3B. For example, when the pilot triggers the ejection sequence, such as by pulling on the ejection handle 206 (FIG. 2), a canopy jettison sequence is initiated to remove the canopy 116. First, the unlatch thruster 214 (FIG. 2) is activated. In some examples, pulling on the ejection handle 206 triggers an explosive cartridge that activates the unlatch thruster 214. In other examples, the ejection system 202 can include an electronic device (e.g., a processor or controller) can trigger the unlatch thruster 214 when the ejection handle 206 is pulled. The unlatch thruster 214 propels the canopy 116 aft (to the left in FIG. 3B, as shown by the arrow) to the second position shown in FIG. 3B. The frame 208 of the canopy 116 slides along the canopy sill 210 (FIG. 2). As the canopy 116 moves aft, an inner surface 316 of the hinge slot 302 engages the pivot pin 304, as shown in FIG. 3B. Further, as the canopy 116 moves aft, the roller 310 is no longer constrained by the roller slot 308 and is now clear of the cam 306, as shown in FIG. 3B. Therefore, the canopy 116 is slidable on the forward fuselage 112 from the first position (FIG. 3A) in which the roller 310 is disposed in the roller slot 308 to the second position (FIG. 3B) in which the roller 310 is not disposed in the roller slot 308.

Figure 3C:
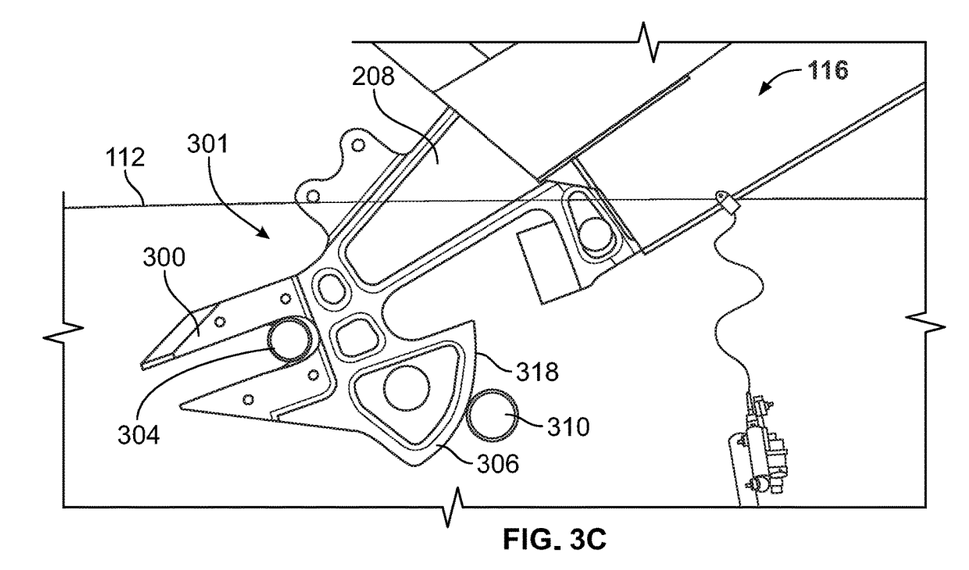
Figure 3D:
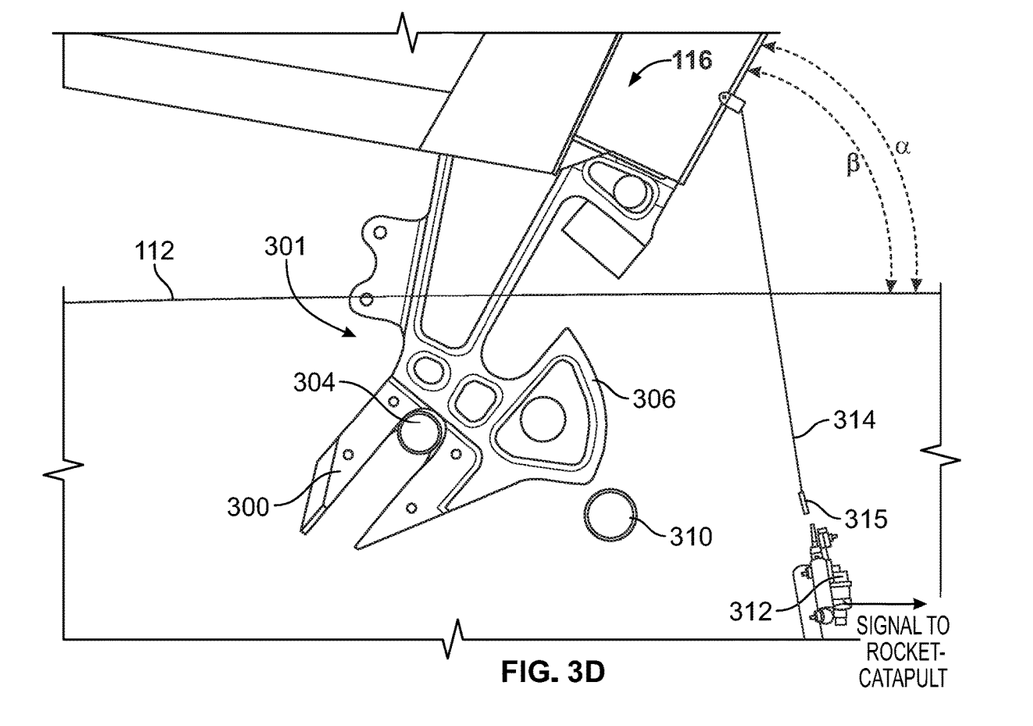

After the canopy 116 is moved aft to the second position, the rocket motor 216 (FIG. 2) is activated. In some examples, after the unlatch thruster 214 (FIG. 2) strokes a certain linear distance, high pressure gas is ported off the unlatch thruster 214 and used to activate the rocket motor 216. In other examples, the ejection system 202 can include an electronic device (e.g., a processor or controller) to trigger the rocket motor 216 after the unlatch thruster 214 has moved the canopy 116 to the second position. The rocket motor 216 propels, launches, and/or otherwise moves the canopy 116 upward, away from the forward fuselage 112. This causes the canopy 116 to rotate about the pivot pin 304, as shown in FIGS. 3C and 3D. In particular, the hinge fork 300 and the pivot pin 304 form a hinge about which the canopy 116 rotates. As the canopy 116 rotates about the pivot pin 304, the cam 306 slides and/or rolls along the roller 310. In particular, a surface 318 of the cam 306 slides and/or rolls along the cam roller 310, as shown in FIG. 3C. The cam 306 prevents or restricts the hinge portion 301 (and, thus, the canopy 116) from releasing from the pivot pin 304 until the canopy 116 has been rotated a certain angle relative to its initial position (FIG. 3B). This angle is referred to herein as a release angle α, shown in FIG. 3D. The release angle α can also represent an angle between the frame 208 (FIG. 2) and the canopy sill 210 (FIG. 2). This release angle α is determined or defined by the length of the cam 306 (e.g., the length of the surface 318). For example, as shown in FIG. 3C, the hinge portion 301 of the frame 208 is constrained between the pivot pin 304 and the roller 310. The canopy 116 cannot detach from the forward fuselage 112 until the cam 306 clears the roller 310. Therefore, the dimension of the cam 306 defines the release angle α.

Figure 3E:
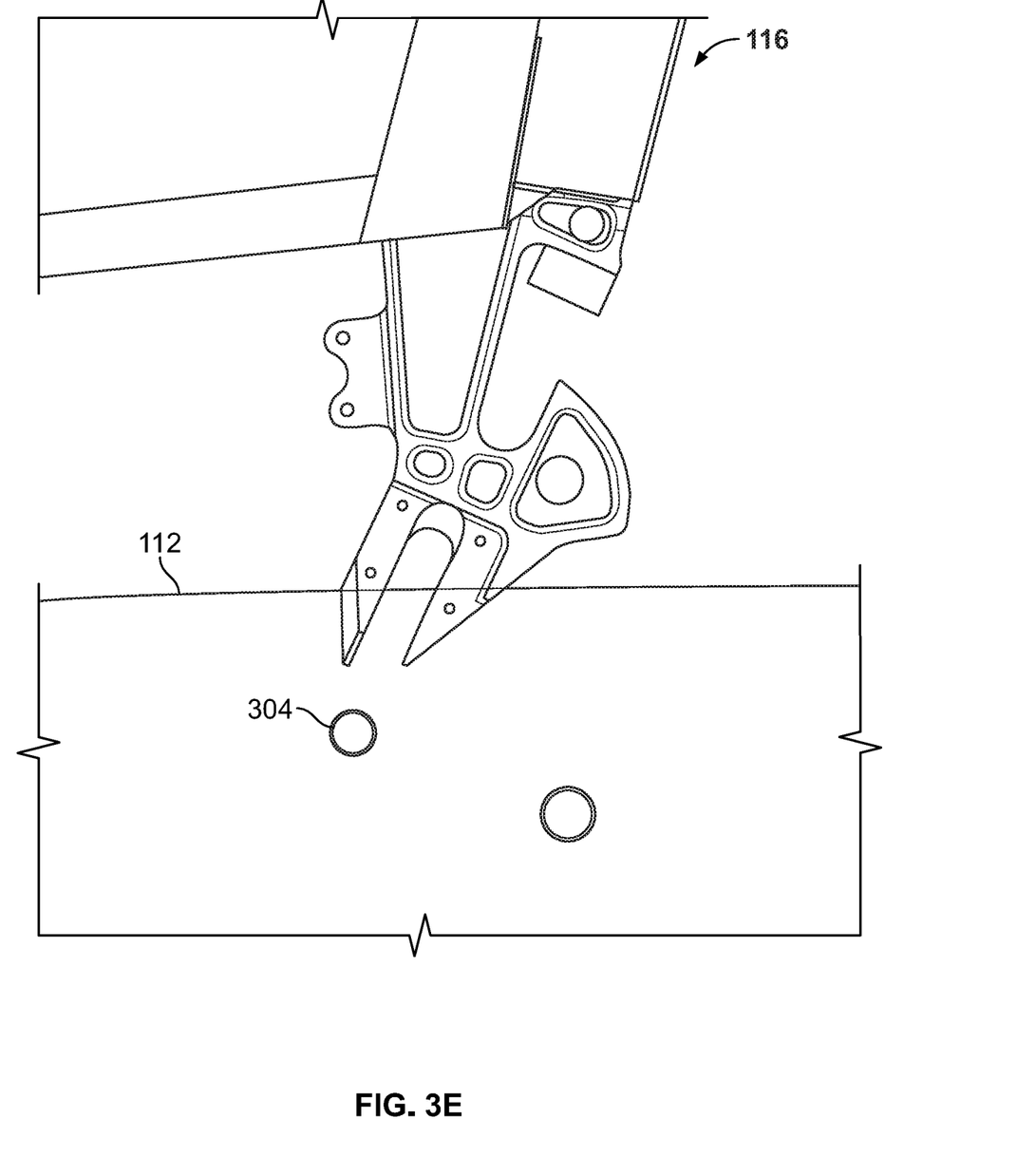

Once the canopy 116 reaches the release angle α, as shown in FIG. 3D, the cam 306 is beyond the roller 310. At this point, the hinge portion 301 is no longer constrained and, thus, the canopy 116 is released from the forward fuselage 112 and the canopy 116 begins to move away from the pivot pin 304. In particular, the momentum of the canopy 116 causes the canopy 116 to start to move radially outward from the pivot pin 304. Therefore, the canopy jettison rocket motor 216, when activated, moves the canopy 116 away from the forward fuselage 112, such that the canopy 116 (1) rotates about the pivot pin 304 until reaching the release angle α and then (2) releases from the pivot pin 304 and moves away from the forward fuselage 112 of the aircraft 100. FIG. 3E shows the canopy 116 after being released from the pivot pin 304 (and, thus, the forward fuselage 112), at which point the canopy 116 continues to move vertically and aft away from the forward fuselage 112 as governed by projectile motion.

Also, as shown in FIG. 3D, when the canopy 116 reaches a certain angle relative to its initial position (FIG. 3B), referred to herein as a lanyard initiation angle β, the lanyard 314 is pulled taught and pulls the pin 315 from the pyrotechnic device 312, which activates the pyrotechnic device 312. The pyrotechnic device 312, when activated, activates or triggers the rocket-catapult 204 (FIG. 2) for ejecting the seat 200 (FIG. 2). As shown in FIG. 3D, the pyrotechnic device 312 outputs a signal that activates or triggers the rocket-catapult 204. In some examples, the signal is an explosive transfer, which transmits or propagates a detonation energy wave from the pyrotechnic device 312 to the rocket-catapult 204. In some examples, the pyrotechnic device 312 acts as a failsafe to ensure the canopy 116 is actually opening before ejecting the seat 200. At the lanyard initiation angle β, the canopy 116 may still be over the seat 200 and in a travel path 402 of the seat 200 (shown in FIG. 4). However, by the time the seat 200 is ejected and traveling along the travel path 402, the canopy 116 will have moved (e.g., rotated) out of the way of the travel path 402, such that the seat 200 (and/or the pilot) do not collide with the canopy 116. Therefore, the lanyard initiation angle β is an angle that ensures a clear travel path for a travel path for the seat 200. The lanyard initiation angle β can be based on various parameters of the system, such as rocket motor thrust profiles, canopy mass properties, ejection seat performance, occupant weight, etc. The lanyard 314 is positioned and/or dimensioned to pull the pin 315 when the canopy 116 reaches the lanyard initiation angle β. In other examples, in addition to or as an alternative to the pyrotechnic device 312, the ejection system 202 can include an electronic device that detects the canopy 116 has reached the lanyard initiation angle β and sends an electronic signal to an electronic sequencer that activates the rocket-catapult 204. In this example, the release angle α and the lanyard initiation angle β are the same angle. However, in other examples, the release angle α and the lanyard initiation angle β are different.

Figure 4:
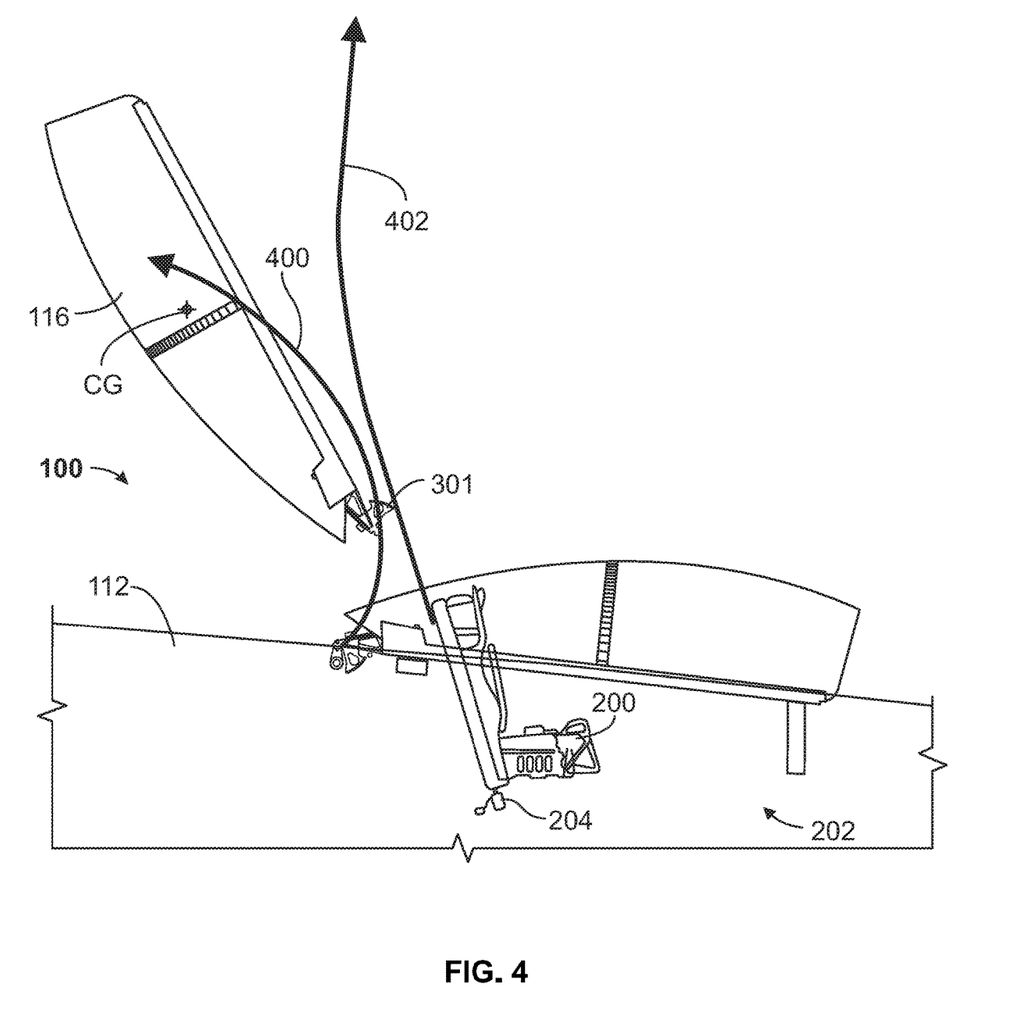
FIG. 4 illustrates an example travel path of an example hinge portion of the example canopy of FIG. 2 and an example travel path of an example seat of the example aircraft.

As shown in FIG. 4, once the canopy 116 is released from the pivot pin 304 (FIGS. 3A-3E), the canopy 116 flies vertically upward and aft (rearward) from the forward fuselage 112. Additionally, once the canopy 116 is released, the canopy 116 is in free motion and begins to rotate about its center of gravity (labeled CG in FIG. 4), which is generally in the counter-clockwise direction in FIG. 4. As a result of this rotation, the rearmost portion of the canopy 116, i.e., the hinge portion 301, swings slightly forward (to the right in FIG. 4) from its initial position before traversing aft.

FIG. 4 shows an example travel path 400 of the hinge portion 301 when the canopy 116 is jettisoned while the aircraft 100 is at zero altitude (sea level) and zero airspeed. FIG. 4 also shows the example travel path 402 for the seat 200 when the seat 200 is ejected while the aircraft 100 is at zero altitude and zero airspeed. The travel paths 400, 402 can also be referred to as ejection paths. As shown in FIG. 4, the travel path 400 of the hinge portion 301 does not intersect the travel path 402 of the seat 200. In particular, the length of the cam 306 (FIGS. 3A-3E) is dimensioned such that when the canopy 116 is jettisoned while the aircraft 100 is at zero altitude and zero airspeed, the travel path 400 of the hinge portion 301 does not intersect the travel path 402 of the seat 200 when the seat 200 is ejected while the aircraft 100 is at zero altitude and zero airspeed. Typically, an ejection at zero altitude and zero airspeed is considered the worse-case scenario. At any altitude above zero and/or any airspeed above zero, the pressure of the air and/or the airflow over the aircraft 100 helps remove the canopy 116 more quickly and, thus, aids in moving the canopy 116 out of the way of the travel path of the seat 200. However, at zero altitude and zero airspeed, such as when the aircraft 100 is sitting stationary on a runway at sea level, the air pressure and airflow do not aid in moving the canopy 116. Therefore, canopies and ejection systems are designed to consider the travel paths at this worse-case scenario.

In known aircraft, the travel path of the rearmost portion of the canopy when the canopy is jettisoned at zero altitude and zero airspeed intersects the travel path of the seat when ejected at zero altitude and zero airspeed. Therefore, known ejection systems require a time delay between the time that the canopy reaches the lanyard initiation angle and the time that the rocket-catapult is activated to eject the seat. This time delay is needed to ensure the rearmost portion of the canopy (e.g., the hinge portion) is clear from the travel path of the seat so that the seat and/or the pilot do not collide with the canopy in mid-air. In these known systems, a delay device (e.g., a delay counter or timer) is implemented between the pyrotechnic device 312 and the ejection seat rocket-catapult 204. For instance, in known systems, after the lanyard 314 pulls the pin 315, a delay timer is activated. Once the delay timer reaches a certain time (e.g., 500 ms), the rocket-catapult 204 is activated. Therefore, in known systems, additional time is needed before ejecting the seat.

The example canopy 116 and ejection system 202 disclosed herein are advantageous because the travel path 400 of the hinge portion 301 (i.e., the rearmost portion of the canopy 116) does not intersect the travel path 402 of the seat 200 at a zero altitude and zero airspeed ejection operation. Therefore, a time delay is not required between the time the canopy 116 reaches the lanyard initiation angle β and the time the seat 200 is ejected to ensure the canopy 116 clears the travel path 402 of the seat 200. As such, once the canopy 116 reaches the lanyard initiation angle β, which is the angle that ensures a clear travel path for the seat 200, the rocket-catapult 204 is activated immediately to eject the seat 200, even while the canopy 116 is still rotating and has not yet detached from the forward fuselage 112. In other words, once the pin 315 (FIG. 3A) is pulled from the pyrotechnic device 312 (FIG. 3A), the pyrotechnic device immediately activates the rocket-catapult 204 without a time delay. This enables the pilot to be ejected from the aircraft 100 earlier than in the known systems that have a time delay. This time may be critical, such as if there is an imminent crash about to occur. As such, the example canopy 116 and example ejection system 202 improve safety by enabling the pilot to be ejected from the cockpit 114 earlier in the ejection sequence than in known systems. Further, the performance requirement envelopes of the canopy removal devices (e.g., the unlatch thruster 214, the rocket motor 216, a canopy remover such as a canopy remover 530 (FIG. 5A), etc.) can be relaxed, which reduces costs and schedule impacts to production and post-production aircraft.

FIGS. 5A-5D illustrate another type of example canopy 500 and an example ejection system 501 during an example canopy jettison sequence. The canopy 500 can be implemented on the aircraft 100 of FIG. 1 as an alternative to the canopy 116, for example. For clarity, the example canopy 500 and its canopy jettison sequence are described in connection with the aircraft 100.

Figure 5A:
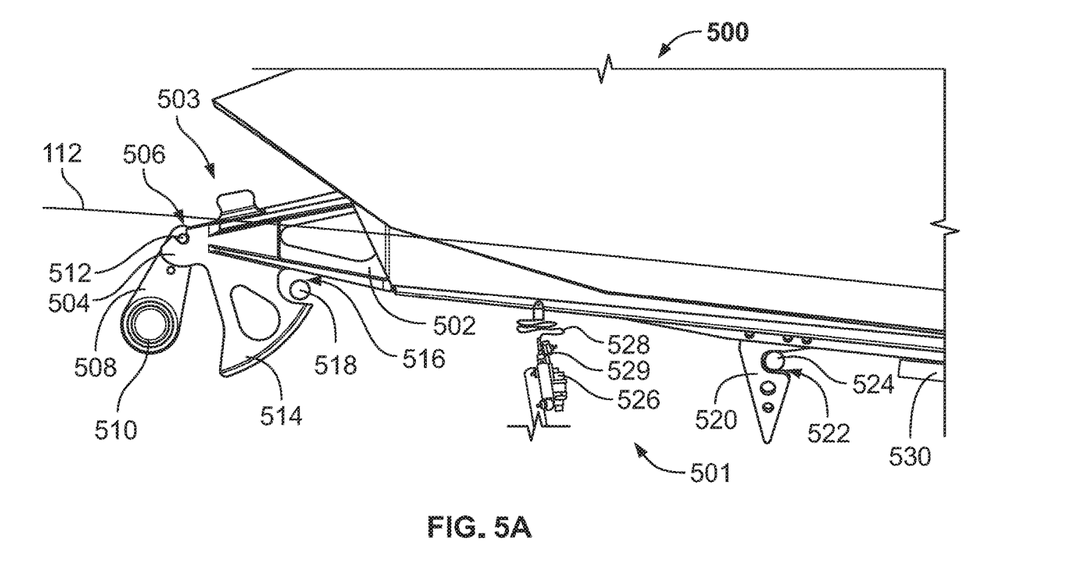
FIGS. 5A-5D illustrates another example jettison sequence implemented in connection with another example canopy.

Referring to FIG. 5A, the canopy 500 includes a frame 502 that can be releasably locked to the canopy sill 210 (FIG. 2). The frame 502 of the canopy 500 has a hinge portion 503 forming the rearmost portion of the canopy 500. In the illustrated example, the hinge portion 503 of the frame 502 includes a hinge fork 504. The hinge fork 504 defines a hinge notch 506. In this example, the aircraft 100 includes a bell crank 508 (e.g., a rocker arm) that is pivotably coupled to the forward fuselage 112 at point 510. A pivot pin 512 is coupled to the bell crank 508 at or near a distal end of the bell crank 508. In the position of the canopy 500 shown in FIG. 5A, the pin 512 is disposed in the hinge notch 506. As such, the hinge portion 503 is engaged with the pivot pin 512. In the illustrated example, the hinge portion 503 of the frame 502 also includes a cam 514. The frame 502 defines a roller slot 516 above the cam 514. The aircraft 100 includes a roller 518 that is coupled to the forward fuselage 112. In some examples, the roller 518 is rotatable about its center or central axis. In this example, the frame 502 also has a locking hook 520 with a notch 522. The aircraft 100 includes a pin 524 that is coupled to the forward fuselage 112.

In FIG. 5A, the canopy 500 is in a first or forward position, which is the typical position that the canopy 500 is in during normal flight operations. In this position, the canopy 500 is securely locked to the forward fuselage 112. During a canopy jettison sequence, the canopy 500 is slid aft (to the left in FIG. 3A) to a second or aft position and then rotated upward, disclosed in further detail in connection with FIG. 5B. In the first position shown in FIG. 5A, the roller 518 is disposed in the roller slot 516, and the pin 524 is disposed in the notch 522. This prevents the canopy 500 from rotating upward and/or otherwise releasing from the forward fuselage 112.

In the illustrated example, the ejection system 501 of the aircraft 100 includes a pyrotechnic device 526 that is coupled to the forward fuselage 112. The ejection system 501 also includes a lanyard 528 that is coupled between the canopy 500 (e.g., the frame 502) and a pin 529 of the pyrotechnic device 526. Similar to the pyrotechnic device 312 disclosed above, the pyrotechnic device 526 can be used to activate the rocket-catapult 204 (FIG. 2) for ejecting the seat 200 (FIG. 2).

As shown in FIG. 5A, ejection system 501 of the aircraft 100 includes a canopy remover 530 coupled to the forward fuselage 112. The canopy remover 530 performs a dual function of moving the canopy 500 aft and launching the canopy 500 upward. The canopy remover 530 can include a rocket, an actuator, a motor, and/or any other device capable of imparting this movement.

Figure 5B:
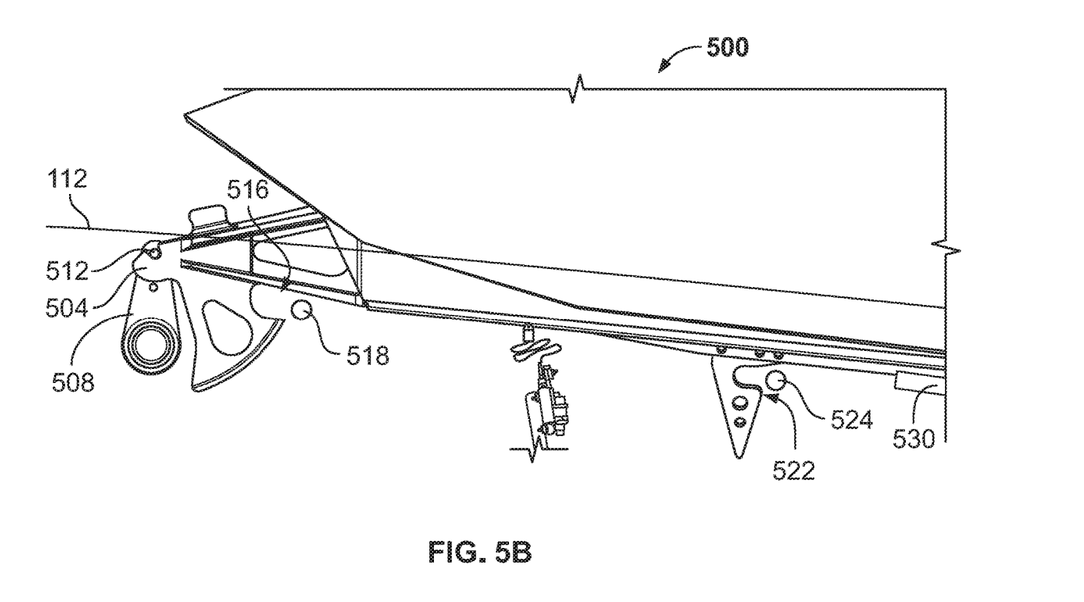

When the pilot triggers the ejection sequence, such as by pulling on the ejection handle 206 (FIG. 2), a canopy jettison sequence is initiated to remove the canopy 500. First, the canopy remover 530 is activated. In some examples, pulling on the ejection handle 206 triggers an explosive cartridge that activates the canopy remover 530. In other examples, the ejection system 501 can include an electronic device (e.g., a processor or controller) to activate the canopy remover 530 when the ejection handle 206 is pulled. The canopy remover 530 slides the canopy 500 aft to unlock the canopy 500. FIG. 5B shows the canopy 500 in the second position after being slide aft. As shown in FIG. 5B, the hinge fork 504 has rotated the bell crank 508 (counter-clockwise in FIG. 5B). In particular, the bell crank 508 is rotated when the canopy 500 is slid between the first position and the second position. The bell crank 508 includes a stop or limiter that prevents the bell crank 508 from rotating beyond a certain angle. This stops the canopy 500 from sliding aft beyond a certain distance. As shown in FIG. 5B, in the second position, the roller 518 is outside of the roller slot 516 and the pin 524 is outside of the notch 522.

Figure 5C:
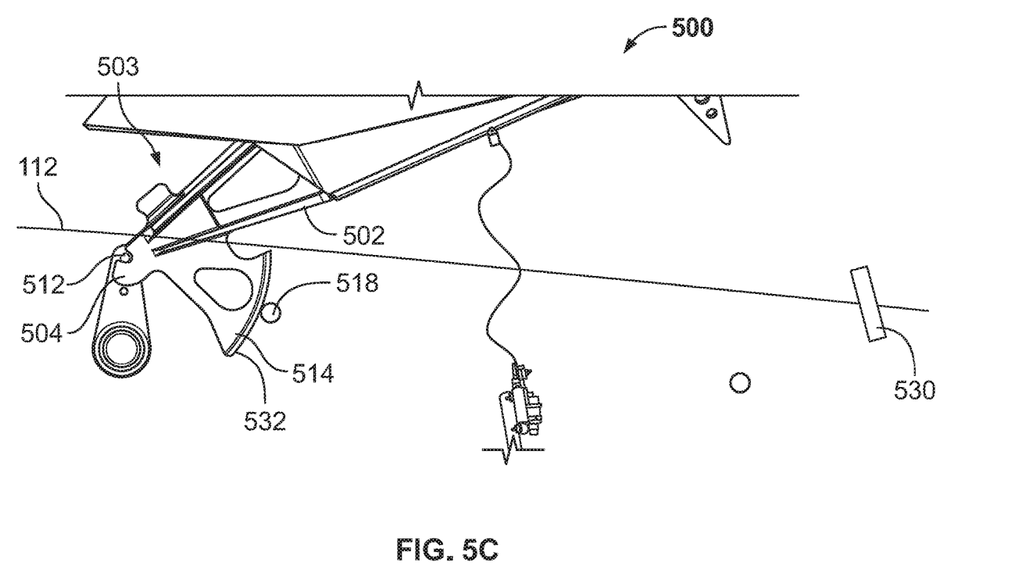
Figure 5D:
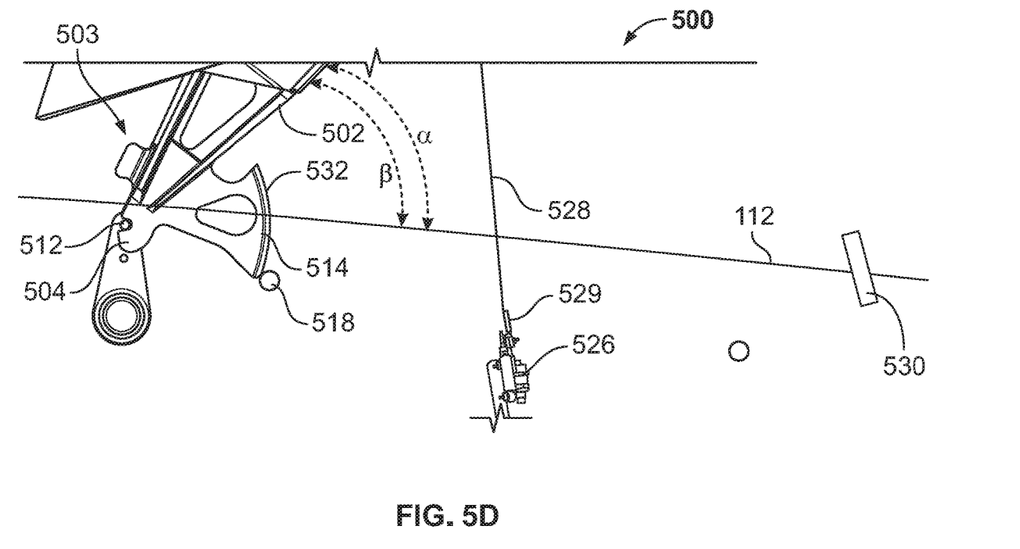

Then, the canopy remover 530 launches the canopy 500 upward (away from the forward fuselage 112). This causes the canopy 500 to rotate about the pivot pin 512, as shown in FIGS. 5C and 5D. In particular, the hinge fork 504 and the pivot pin 512 form a hinge about which the canopy 500 rotates. As the canopy 500 rotates about the pivot pin 512, the cam 514 slides and/or rolls along the roller 518. In particular, a surface 532 of the cam 514 slides and/or rolls along the roller 518. The cam 514 prevents or restricts the hinge portion 503 (and, thus, the canopy 500) from releasing from the pivot pin 512 until the canopy 500 reaches a release angle α. This release angle α is determined or defined by the length of the cam 514. For example, as shown in FIGS. 5C and 5D, the hinge portion 503 of the frame 502 is constrained between the pivot pin 512 and the roller 518. Therefore, the canopy 500 cannot detach from the forward fuselage 112 until the cam 514 clears the roller 518, which defines the release angle α of the canopy 500.

Once the canopy 500 reaches the release angle α, at which point the cam 514 is beyond the roller 518, the canopy 500 can move away from the pivot pin 512. In particular, the momentum of the canopy 500 causes the canopy 500 to start to move radially outward from the pivot pin 512. The canopy 500 eventually releases from the pivot pin 512, at which point the canopy 500 continues to move vertically and aft away from the forward fuselage 112 according to projectile motion. Therefore, the canopy remover 530, when activated, moves the canopy 500 away from the forward fuselage 112, such that the canopy 500 (1) rotates about the pivot pin 512 until reaching the release angle and then (2) releases from the pivot pin 512 and moves away from the forward fuselage 112 of the aircraft 100.

Also, as shown in FIG. 5D, when the canopy 500 reaches the lanyard initiation angle β, the lanyard 528 is pulled taught and pulls the pin 529 from the pyrotechnic device 526, which activates the pyrotechnic device 526. The pyrotechnic device 526, when activated, activates the rocket-catapult 204 (FIG. 2) for ejecting the seat 200 (FIG. 2). In other examples, in addition to or as an alternative to the pyrotechnic device 526, the ejection system 501 can include an electronic device that detects the canopy 500 has reached the lanyard initiation angle β and sends an electronic signal to an electronic sequencer that activates the rocket-catapult 204. In this example, the release angle α and the lanyard initiation angle β are the same angle. However, in other examples, the release angle α and the lanyard initiation angle β can be different.

Once the canopy 500 is released from the pivot pin 512, the canopy 500 flies vertically upward and aft (rearward) from the forward fuselage 112. Similar to the canopy 116 disclosed above in connection with FIGS. 3A-4, the length of the cam 514 is dimensioned such that when the canopy 500 is jettisoned while the aircraft 100 is at a zero altitude and zero airspeed, the travel path of the hinge portion 503 (i.e., the rearmost portion) of the canopy 500 does not intersect the travel path 402 of the seat 200 (see FIG. 4) when the seat 200 is ejected while the aircraft is at zero altitude and zero airspeed. Therefore, the travel paths do not intersect in the worse-case scenario. As such, the ejection system 501 does not require a time delay to ensure the canopy 500 clears the travel path 402 of the seat 200. Thus, once the canopy 500 reaches the lanyard initiation angle β, the seat 200 can be ejected immediately, even while the canopy 500 is still rotating and has not yet detached. For example, the pyrotechnic device 526 can activate the rocket-catapult 204 (FIG. 2) immediately without delay. This enables the pilot to be ejected from the aircraft 100 earlier in the ejection operation than in known systems.

As explained above, in some examples, the rocket-catapult 204 can be activated without a time delay once the canopy 116 (or the canopy 500) reaches a certain angle, such as the lanyard initiation angle β. However, in some examples, the ejection system 202 (or the ejection system 501) may utilize one or more time delays (e.g., an inertia reel haul back time) regardless of the canopy clearance.

Figure 6:
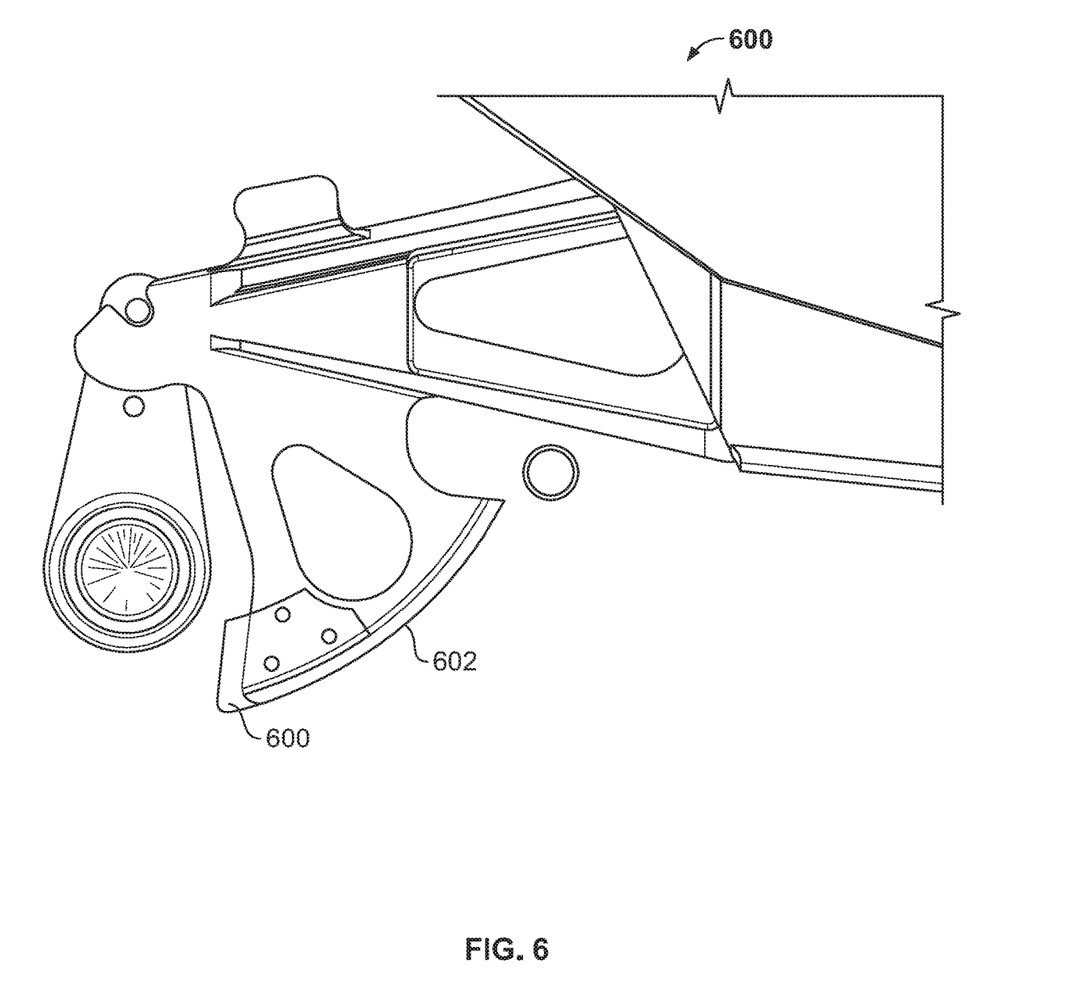
FIG. 6 illustrates an example extender that can be coupled to an example cam of an example canopy.

FIG. 6 shows an example cam extender 600 that can be coupled to a cam 602 of a known canopy 604. Known canopies have cams that are relatively short, which results in the canopy being released from the forward fuselage 112 earlier in the rotation. This results in the travel path of the hinge portion of the canopy intersecting the travel path of the seat. To remedy this drawback, the cam extender 600 can be coupled to the cam 602. As shown in FIG. 6, the cam extender 600 increases the total length of the cam 602, thereby increasing the total rotation of the canopy 604 (e.g., an addition 5° of rotation) before free motion release. As a result, the canopy 604 is released later in the rotation such that the travel path of the hinge portion does not intersect the travel path of the seat. This enables the seat to be ejected earlier, without a time delay.

Figure 7:
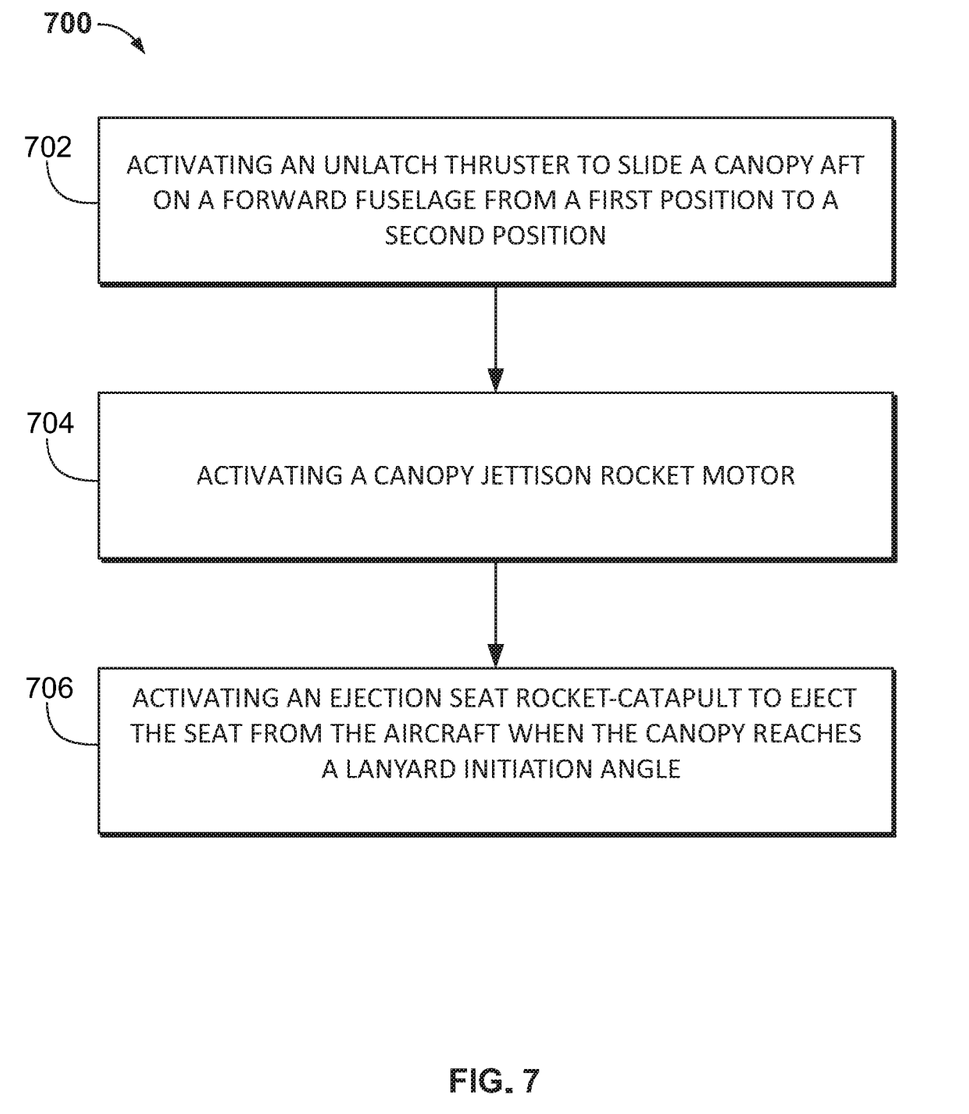
FIG. 7 is a flowchart representative of an example method of jettisoning an example canopy and ejecting a seat that can be implemented in connection with the examples disclosed herein.

FIG. 7 is a flowchart representative of an example method 700 of an example ejection sequence to jettison a canopy and eject a seat of an aircraft. For clarity, the example method 700 is described in connection with the canopy 116 and the ejection system 202. However, it is understood the example method 700 could be similarly performed in connection with the canopy 500 and the ejection system 501 of FIGS. 5A-5D.

In some examples, the ejection sequence of FIG. 7 is activated in response to the pilot pulling the ejection handle 206. At block 702, the example method 700 includes activating the unlatch thruster 214 to slide the canopy 116 aft on the forward fuselage 112 from the first position (FIG. 3A) to the second position (FIG. 3B). In some examples, pulling on the handle 206 triggers an explosive cartridge that activates the unlatch thruster 214.

At block 704, the example method 700 includes activating the canopy jettison rocket motor 216. In some examples, the unlatch thruster 214 activates the rocket motor 216 once the canopy 116 is in the second position. As shown in connection with FIGS. 3A-3E, the activating of the canopy jettison rocket motor 216 causes the canopy 116 to (1) rotate about the pivot pin 304 until reaching the release angle α and then (2) release from the pivot pin 304 and move away from the forward fuselage 112 of the aircraft 100. The cam 306 is dimensioned such that when the canopy 116 is jettisoned while the aircraft 100 is at zero altitude and zero airspeed, the travel path 400 of the hinge portion 301 of the canopy 116 does not intersect the travel path 402 of the seat 200 when the seat 200 is ejected while the aircraft 100 is at zero altitude and zero airspeed.

At block 706, the example method 700 includes activating the ejection seat rocket-catapult 204 to eject the seat from the aircraft 100 when the canopy 116 reaches an angle (the lanyard initiation angle β). In some examples, the ejection seat rocket-catapult 204 is activated by the pyrotechnic device 312 when the pin 315 is pulled. Because the travel path 400 of the hinge portion 301 of the canopy 116 does not intersect the travel path 402 of the seat 200, the pilot is safely ejected from the aircraft 100.

The example method 700 can be similarly implemented in connection with the canopy 500 of FIGS. 5A-5D. In such, an example, the canopy remover 530 performs both the aft movement and the upward movement of the canopy 500.

From the foregoing, it will be appreciated that example methods, apparatus, systems, articles of manufacture have been disclosed that reduce or eliminate the risk of collision of a pilot (or passenger) and a canopy during an ejection operation at the worse-case scenario. The examples disclosed herein enable the pilot (or passenger) to be ejected earlier in the ejection operation, thereby improving safety by reducing the amount of time the pilot (or passenger) remains in the aircraft after initiating the ejection operation. The examples disclosed herein also reduce the sensitivity to canopy removing rockets and actuator performance. Further, the examples disclosed herein reduce sensitivity to canopy, seat, and aircraft performance and mass properties.

Example methods, apparatus, systems, and articles of manufacture are disclosed herein. Further examples and combinations thereof include the following:

Example 1 is an aircraft comprising a forward fuselage defining a cockpit, a seat in the cockpit, a pivot pin coupled to the forward fuselage, and a canopy removably coupled to the forward fuselage over the cockpit. The canopy includes a frame having a hinge portion engaged with the pivot pin. The hinge portion includes a cam. The aircraft further includes a canopy jettison rocket motor to, when activated, move the canopy away from the forward fuselage, such that the canopy (1) rotates about the pivot pin until reaching a release angle and then (2) releases from the pivot pin and moves away from the forward fuselage. The cam is to restrict the canopy from releasing from the pivot pin until the canopy reaches the release angle. The cam is dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

Example 2 includes the aircraft of Example 1, further including a roller coupled to the forward fuselage. The cam is to slide and/or roll along the roller when the canopy is rotated about the pivot pin.

Example 3 includes the aircraft of Example 2, wherein the frame defines a roller slot above the cam.

Example 4 includes the aircraft of Example 3, wherein the canopy is slidable on the forward fuselage from a first position in which the roller is disposed in the roller slot to a second position in which the roller is not disposed in the roller slot.

Example 5 includes the aircraft of Example 4, further including a canopy unlatch thruster to, when activated, move the canopy from the first position to the second position.

Example 6 includes the aircraft of Example 5, wherein the canopy unlatch thruster is to activate the canopy jettison rocket motor once the canopy is in the second position.

Example 7 includes the aircraft of Example 6, further including an ejection handle, wherein the ejection handle is to, when triggered, activate the canopy unlatch thruster.

Example 8 includes the aircraft of any of Examples 1-7, wherein the hinge portion of the frame includes a hinge fork defining a slot, the pivot pin disposed in the slot.

Example 9 includes the aircraft of any of Examples 1-8, further including an ejection seat rocket-catapult to, when activated, eject the seat from the cockpit.

Example 10 includes the aircraft of Example 9, further including a pyrotechnic device coupled to the forward fuselage, and a lanyard coupled between the canopy and a pin of the pyrotechnic device.

Example 11 includes the aircraft of Example 10, wherein, when the pin is pulled from the pyrotechnic device, the pyrotechnic device is to activate the ejection seat rocket-catapult without a delay time.

Example 12 is a method comprising activating a canopy jettison rocket motor on an aircraft. The activating of the canopy jettison rocket motor causes a canopy to (1) rotate about a pivot pin until reaching a release angle and then (2) release from the pivot pin and move away from a forward fuselage of the aircraft. The canopy includes a frame having a hinge portion. The hinge portion includes a cam to restrict the canopy from releasing from the pivot pin until the canopy reaches the release angle. The cam is dimensioned such that when the canopy is jettisoned while the aircraft is at zero altitude and zero airspeed, a travel path of the hinge portion does not intersect a travel path of a seat when the seat is ejected while the aircraft is at zero altitude and zero airspeed.

Example 13 includes the method of Example 12, further including activating an ejection seat rocket-catapult to eject the seat when the canopy reaches a lanyard initiation angle.

Example 14 includes the method of Example 13, wherein the activating of the ejection seat rocket-catapult does not include a time delay.

Example 15 includes the method of any of Examples 12-14, further including, prior to activating the canopy jettison rocket motor, activating an unlatch thruster to slide the canopy aft on the forward fuselage from a first position to a second position.

Example 16 includes the method of Example 15, wherein the frame defines a roller slot above the cam. The aircraft includes a roller. In the first position, the roller is disposed in the roller slot, and in the second position, the roller is not disposed in the roller slot.

Example 17 includes the method of Example 16, wherein the cam slides and/or rolls along the roller when the canopy is rotated about the pivot pin.

Example 18 is an aircraft comprising a forward fuselage defining a cockpit, a seat in the cockpit, a bell crank pivotably coupled to the forward fuselage, a pivot pin coupled to the bell crank, and a canopy removably coupled to the forward fuselage over the cockpit. The canopy includes a frame having a hinge portion engaged with the pivot pin. The hinge portion includes a cam. The aircraft further includes a canopy remover to, when activated, move the canopy away from the forward fuselage, such that the canopy (1) rotates about the pivot pin until reaching a release angle and then (2) releases from the pivot pin and moves away from the forward fuselage. The cam is to restrict the canopy from releasing from the pivot pin until the canopy reaches the release angle. The cam is dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

Example 19 includes the aircraft of Example 18, wherein the canopy remover is to, when activated, slide the canopy aft on the forward fuselage from a first position to second position.

Example 20 includes the aircraft of Example 19, wherein the bell crank is rotated when the canopy is slid between the first position and the second position.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
a forward fuselage defining a cockpit;
a seat in the cockpit;
a pivot pin coupled to the forward fuselage;
a canopy removably coupled to the forward fuselage over the cockpit, the canopy including a frame having a hinge portion engaged with the pivot pin, the hinge portion including a cam; and
a canopy jettison rocket motor to, when activated, move the canopy away from the forward fuselage, such that the canopy (1) rotates about the pivot pin until reaching a release angle and then (2) releases from the pivot pin and moves away from the forward fuselage, the cam to restrict the canopy from releasing from the pivot pin until the canopy reaches the release angle, the cam dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

2. The aircraft of claim 1, further including a roller coupled to the forward fuselage, the cam to slide and/or roll along the roller when the canopy is rotated about the pivot pin.

3. The aircraft of claim 2, wherein the frame defines a roller slot above the cam.

4. The aircraft of claim 3, wherein the canopy is slidable on the forward fuselage from a first position in which the roller is disposed in the roller slot to a second position in which the roller is not disposed in the roller slot.

5. The aircraft of claim 4, further including a canopy unlatch thruster to, when activated, move the canopy from the first position to the second position.

6. The aircraft of claim 5, wherein the canopy unlatch thruster is to activate the canopy jettison rocket motor once the canopy is in the second position.

7. The aircraft of claim 6, further including an ejection handle, wherein the ejection handle is to, when triggered, activate the canopy unlatch thruster.

8. The aircraft of claim 1, wherein the hinge portion of the frame includes a hinge fork defining a slot, the pivot pin disposed in the slot.

9. The aircraft of claim 1, further including an ejection seat rocket-catapult to, when activated, eject the seat from the cockpit.

10. The aircraft of claim 9, further including:
a pyrotechnic device coupled to the forward fuselage; and
a lanyard coupled between the canopy and a pin of the pyrotechnic device.

11. The aircraft of claim 10, wherein, when the pin is pulled from the pyrotechnic device, the pyrotechnic device is to activate the ejection seat rocket-catapult without a delay time.

12. A method comprising:
activating a canopy jettison rocket motor on an aircraft, wherein the activating of the canopy jettison rocket motor causes a canopy to (1) rotate about a pivot pin until reaching a release angle and then (2) release from the pivot pin and move away from a forward fuselage of the aircraft, the canopy including a frame having a hinge portion, the hinge portion including a cam to restrict the canopy from releasing from the pivot pin until the canopy reaches the release angle, the cam dimensioned such that when the canopy is jettisoned while the aircraft is at zero altitude and zero airspeed, a travel path of the hinge portion does not intersect a travel path of a seat when the seat is ejected while the aircraft is at zero altitude and zero airspeed.

13. The method of claim 12, further including activating an ejection seat rocket-catapult to eject the seat when the canopy reaches a lanyard initiation angle.

14. The method of claim 13, wherein the activating of the ejection seat rocket-catapult does not include a time delay.

15. The method of claim 12, further including, prior to activating the canopy jettison rocket motor, activating an unlatch thruster to slide the canopy aft on the forward fuselage from a first position to a second position.

16. The method of claim 15, wherein the frame defines a roller slot above the cam, wherein the aircraft includes a roller, and wherein, in the first position, the roller is disposed in the roller slot, and in the second position, the roller is not disposed in the roller slot.

17. The method of claim 16, wherein the cam slides and/or rolls along the roller when the canopy is rotated about the pivot pin.

18. An aircraft comprising:
a forward fuselage defining a cockpit;
a seat in the cockpit;
a bell crank pivotably coupled to the forward fuselage;
a pivot pin coupled to the bell crank;
a canopy removably coupled to the forward fuselage over the cockpit, the canopy including a frame having a hinge portion engaged with the pivot pin, the hinge portion including a cam; and
a canopy remover to, when activated, move the canopy away from the forward fuselage, such that the canopy (1) rotates about the pivot pin until reaching a release angle and then (2) releases from the pivot pin and moves away from the forward fuselage, the cam to restrict the canopy from releasing from the pivot pin until the canopy reaches the release angle, the cam dimensioned such that when the canopy is jettisoned while the aircraft is at zero altitude and zero airspeed, a travel path of the hinge portion does not intersect a travel path of the seat when the seat is ejected while the aircraft is at zero altitude and zero airspeed.

19. The aircraft of claim 18, wherein the canopy remover is to, when activated, slide the canopy aft on the forward fuselage from a first position to second position.

20. The aircraft of claim 19, wherein the bell crank is rotated when the canopy is slid between the first position and the second position.

* * * * *